United States Patent Office 3,041,328
Patented June 26, 1962

---

3,041,328
METALLIZED DISAZO DYES
Wilhelm Kraus, Jr., and Willy Steinemann, Basel, Switzerland, assignors to Sandoz Ltd., Basel, Switzerland
No Drawing. Filed May 6, 1960, Ser. No. 27,248
Claims priority, application Switzerland May 9, 1959
6 Claims. (Cl. 260—176)

This invention relates to new azo dyes which possess excellent properties. They have the general formula:

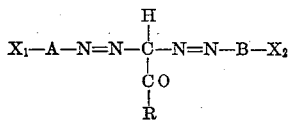

and can be metallized.

In this formula A and B represent identical or different isocyclic aromatic or heterocyclic radicals of aromatic character, R an aryl radical, and $X_1$ and $X_2$ identical or different groups capable of metal complex formation and occupying positions adjacent to the nitrogen bridge.

These dyes belong to the formazane series.

A further object of the invention is the process of production of the dyes as described in the following, and their use for the dyeing and printing of fibers and fiber materials and the products thereby obtained.

The radicals A, B and R may be substituted with one or more radicals which are water-solubilizing or do not increase the solubility in water. Suitable radicals of this type are, e.g. sulphonic acid, carboxylic acid and sulfonic groups, sulfamide groups which may be substituted on the nitrogen atom, alkyl groups, in particular those having up to four carbon atoms, alkoxy groups, nitro groups, halogen atoms, in particular fluorine, chlorine or bromine atoms, halogen-containing N-heterocyclic compounds, e.g. mono- or dihalogenotriazine radicals, di- or trihalogenopyrimidine radicals or the acrylic acid radical. Further substituents of the radicals A, B and R which are specially important are amino, hydroxy and thiol groups which are linked with the radical directly or through a bridge member and contain reactive hydrogen, and groups which are convertible into the aforesaid groups, because these can be reacted with di- or trihalogenotriazines or tri- or tetrahalogenopyrimidines or generally with compounds possessing more than one mobile halogen atom, to give reactive dyestuffs.

These new compounds are obtained by coupling in alkaline medium 2 moles of a diazo compound or a mixture of diazo compounds of amines, which contain in the adjacent position to the amino group a group capable of metal complex formation or a substituent (y) convertible into such a group, with 1 mole of a methylaryl ketone, and metallizing the resulting azo dyestuff, if desired, in substance or on the fiber by treatment with a metal-yielding agent, after the substituent (y), when present, has been converted into a group capable of metal complex formation.

The diazo compounds employed are produced in the normal way by diazotization of primary amines, which may be mono- or multinuclear and below in general to the benzene and naphthalene series.

The position adjacent to the amino group must be occupied by a group forming compounds with metals, e.g. a hydroxyl, carboxyl, amino or sulfamide group, or by a radical, e.g. a methoxy radical, which is convertible into such a group before or during the metallizing reaction.

The coupling reaction of the resulting diazo compounds with the methylaryl ketone is carried out in alkaline medium, preferably in the temperature range of about —5° to +35° and at a pH value of at least 9, preferably 9 to 12, this value being obtained by the addition of agents of alkaline reaction, e.g. basic metal hydroxides or carbonates, particularly alkali or earth alkali metals or magnesium. Even when water-soluble methylaryl ketones are employed the coupling reaction is successfully accomplished in aqueous alkaline suspension without the addition of an organic solvent. However, organic solvents and dispersing agents as well can be used if desired. Particularly suitable solvents are, e.g. pyridine, dimethyl formamide, formamides in general and hydrocarbons which may be substituted, e.g. chlorobenzene. They are employed in amounts about 1 to 5 times greater than that weight of the coupling compound.

Metallization of the dyestuff formed is carried out by the normal method, e.g. by treatment with solutions of copper, cobalt, nickel, chromium or zinc salts. The complexes obtained contain 1 molecule of dyestuff combined with 1 metal atom. The metallization can be effected in aqueous and/or organic medium, e.g. in mixtures containing formamides, glycol, polyglycols or acetamide. It is also possible to carry out the metallisation together with the coupling reaction.

The azo dyestuffs obtained, especially in the metallized form, are fast to light, stable to acids, deeply colored and of high tinctorial value. Depending upon whether they are substituted by water-solubilizing or non-water-solubilizing groups, they can be employed as pigments or as water-soluble dyestuffs for printing and pad dyeing. All natural and synthetic fibers and fiber materials can be dyed with them. They are especially well suited for dyeing wool and silk and synthetic nitrogeneous fibers such as the polyamides, e.g. the types made from diamines such as hexamethylene diamine and dicarboxylic acids such as adipic acid, lactams such as ε-caprolactam or ω-capryllactam and ω-aminocarboxylic acids such as ω-aminoundecanic acid. These polyamides are marketed under the names nylon, Perlon and Rilsan, the latter two being registered trademarks. The new dyestuffs and pigments can also be used for dyeing plastics, lacquers, varnishes etc.

In the examples all parts are by weight and the temperatures are given in degrees centigrade.

*Example 1*

30 parts of 2-aminobenzene-1-carboxylic acid are dissolved in 150 parts of water with 36 parts of 30% hydrochlorid acid and diazotized at 0° with 15.2 parts of sodium nitrite. The pH value of the diazo solution is brought to 9 with the necessary amount of sodium carbonate and 60 parts of a 30% solution of 4-acetoaminoacetophenone in dimethyl formamide is added. To complete the reaction a sufficient quantity of 10% aqueous sodium hydroxide solution is added dropwise over the next two hours with constant cooling to 0° and vigorous stirring, until the pH value of the mass is 12. Stirring is continued at 0° until the diazo compound is no longer indicated and the new disazo dyestuff is isolated by neutralization, precipitation and filtration. On drying and grinding, a red-brown powder is obtained which dissolves in water to give orange solutions.

Dyeings of this dyestuff on polyamide fibers, when aftertreated with copper, cobalt or nickel yielding agents, are of red shade, and similarly aftertreated dyeings on leather of green shade; in both cases fastness properties are very good.

The new disazo dyestuff can be treated in substance with copper, cobalt or nickel yielding agents by dissolving it in water to give a neutral or weakly acid solution, adding an equeous solution of a metal salt, e.g. copper sulfate, and heating for some time at temperatures between about 60° and 100° until metallization is completed. The products are sparingly soluble metal complexes which, after being brought into a fine state of division, are highly suitable for dyeing polyamide fiber fabrics of irregular affinity in bright, level red or green shades of good fastness to light and washing.

Very similar disazo dyestuffs possessing the same excellent properties are obtained by the procedure described in the foregoing, using as starting product in place of the diazo compound produced from 30 parts of 2-aminobenzene-1-carboxylic acid, the equivalent amount of a diazo compound produced from any one of the following:

2-amino-5-nitrobenzene-1-carboxylic acid,
2-amino-5-chlorobenzene-1-carboxylic acid,
2-amino-1-carboxybenzene-5-sulfonic acid amide,
2-amino-1-carboxybenzene-5-sulfonic acid methyl amide,
2-amino-1-carboxybenzene-5-sulfonic acid-3'-methoxypropylamide,
2-amino-1-carboxybenzene-5-sulfonic acid anilide,
2-amino-1,2'-dicarboxybenzene-5-sulfonic acid anilide, or
2-amino-1-carboxybenzene-3'-sulfamido-5-sulfonic acid anilide.

It is possible to arrive at further analogous dyestuffs when the 18 parts of 4-acetaminoacetophenone are replaced by an equivalent amount of acetophenone,
methyldiphenylketone,
1-acetylnaphthalene,
2-acetylnaphthalene,
6-acetyltetrahydronaphthalene,
1-acetylnaphthalene-4-sulfonic acid amide,
acetophenone-4-sulfonic acid-3'-methoxypropylamide,
acetophenone-4-sulfonic acid,
acetophenone-2-carboxylic acid,
4-maleylaminoacetophenone,
4-(α-chloroacetamino)-acetophenone,
4-dimethylaminosulfaminoacetophenone,
4-methanesulfonylaminoacetophenone,
4-oxazolidonylacetophenone,
4-pyrrolidonylacetophenone,
1-acetyl-4-formaminonaphthalene,
1-acetyl-4-chloroacetylaminonaphthalene,
4-phenylacetophenone,
4-methylacetophenone,
ω-chloroacetophenone,
ω-chloroacetylonaphthalene,
3-chloroacetophenone or
3-nitroacetophenone.

Also, the acetyl group in the 4-acetylaminoacetophenone radical can be replaced by a halogen-containing heterocyclic radical, e.g. a dichlorotriazine or di- or trichloropyrimidine radical.

*Example 2*

27.8 parts of 2-amino-1-hydroxybenzene-4-sulfonic acid anilide are dissolved in 150 parts of warm water and 19 parts of concentrated hydrochloric acid. The solution is cooled to 0° diazotized and at this temperature it is with 7.3 parts of sodium nitrite. To the resulting diazo suspension are added 17 parts of 1-acetylnaphthalene and the pH value of the mass is then increased to 12 by dropping in 20% aqueous sodium hydroxide solution with very thorough stirring and cooling to 0°. Stirring is continued at 0° until the coupling reaction is completed and the disazo dyestuff is isolated by neutralization, salting out and filtration. It is dried to give a red powder which dissolves in water with a red coloration. Dyeings of this dyestuff on polyamide fibers, on treatment with copper, cobalt or nickel yielding agents, are of reddish grey, blue-grey or reddish brown shade and of very good fastness.

When the new disazo dyestuff is treated in substance with a copper yielding agent, a copper complex is obtained which dyes polyamide fibers in bright, fast greyish violet shades. The cobalt complex compounds gives a blue-grey, and the nickel complex compound a brown dyeing.

Very similar copper, cobalt and nickel complexes with equally good properties are obtained when the 17 parts of 1-acetylnaphthalene are replaced by an equivalent amount of 1-acetylnaphthalene-4-sulfonic acid amide,
1-acetylnaphthalene-4-methylsulfon,
acetophenone,
acetophenone-2-carboxylic acid,
acetophenone-4-sulfonic acid,
4-acetaminoacetophenone,
4-chloroacetoaminoacetophenone,
4-dimethylaminosulfaminoacetophenone,
4-methanesulfonylaminoacetophenone,
4-oxazolidonyl- or 4-pyrralidonylacetophenone, or when the 27.8 parts of 2-amino-1-hydroxybenzene-4-sulfonic acid anilide are replaced by the equivalent amount of 2-amino-1-hydroxybenzene-4-(or -5-)sulfonic acid amide,
2-amino-1-hydroxybenzene-4-(or -5-)sulfonic acid methyl amide,
2-amino-1-hydroxybenzene-4-(or -5-)sulfonic acid-2'-hydroxyethylamide,
2-amino-1-hydroxybenzene-4-(or -5-)sulfonic acid-3'-methoxypropylamide,
2-amino-1-hydroxybenzene-4-(or -5-)sulfonic acid isopropylamide,
2-amino-1-hydroxybenzene-4-(or -5-)sulfonic acid cyclohexylamide,
2-amino-1-hydroxybenzene-4-(or -5-)sulfonic acid morpholide,
2-amino-1-hydroxybenzene-4-(or -5-)sulfonic acid phenyl amide-2'-carboxylic acid,
2-amino-1-hydroxybenzene-4-(or -5-)sulfonic acid phenyl amide-3'-sulfonic acid, or
2-amino-1-hydroxybenzene-4-(or -5-)sulfonic acid phenyl amide-3'-sulfonic acid amide, and the procedure described above is followed in all other respects.

*Example 3*

15.4 parts of 2-amino-1-hydroxy-4-nitrobenzene and 20.7 parts of 2-amino-1-hydroxybenzene-4-sulfamide are dissolved in a mixture of 100 parts of water and 23 parts of concentrated hydrochloric acid. The solution is diazotized at 0° with 14.5 parts of sodium nitrite. 12 parts of acetophenone are added to the diazo suspension and the pH value of the reaction mass is increased to 11.5–12 by dropwise addition of 15% aqueous sodium hydroxide solution at 0–2° with vigorous stirring. The mass is stirred further at 0–2° to bring the reaction to its close, and the new disazo dyestuff is subsequently isolated at room temperature by neutralization, precipitation and filtration.

The dried dyestuff is a dark powder which dissolves in water with a brown coloration. When dyed on wool or polyamide fibers and aftertreated with a copper, cobalt or nickel yielding agent, it gives dyeings of reddish grey, greyish olive or brown shade respectively which possess very good fastness properties.

When the disazo dyestuff obtained is treated in substance with a copper, cobalt or nickel yielding agent, the products are metal-containing azo dyestuffs which dye polyamide fibers and leather in fast, reddish grey, greyish olive or brown shades.

Example 4

30.8 parts of 2-amino-1-hydroxy-4-nitrobenzene are dissolved in 120 parts of water with 28 parts of concentrated hydrochloric acid and diazotized at 5° with 13.8 parts of sodium nitrite. 11.5 parts of acetophenone are added to the diazo suspension and the pH value of the reaction mass increased to 11.5–12 by dropwise addition of 15% sodium hydroxide solution with good stirring and cooling to 0°. The mass is stirred at 0° until completion of the coupling reaction, and the new disazo dyestuff is then isolated by neutralization, precipitation and filtration. On drying, it is a dark powder which dissolves in water to give brown solution. When dyed on polyamide fibers or leather and aftertreated with copper, cobalt or nickel yielding agents, very fast violet-grey, blue-grey or bluish brown shades are obtained.

When the disazo dyestuff is treated in substance with copper, cobalt or nickel yielding agent, copper, cobalt or nickel complexes are obtained which dye polyamide fibers and leather in very fast, bright reddish blue, blue-grey or brown shades.

It is possible to arrive at similar disazo dyestuffs with equally good properties by the same route when the 30.8 parts of 2-amino-1-hydroxy-4-nitrobenzene are replaced by an equivalent amount of 2-amino-5-nitro-1-hydroxybenzene, 2-amino-5-nitro-4-chloro-1-hydoxybenzene, 2-amino-4-nitro-6-chloro-1-hydroxybenzene, 2-amino-6-nitro-4-chloro-1-hydroxybenzene or 2-amino-4.6-dinitro-1-hydroxybenzene.

Example 5

27.5 parts of diazotized 1-amino-2-hydroxynaphthalene-4-sulfonic acid and 12 parts of acetophenone are stirred into 50 parts of dimethyl formamide. 28 parts of a 30% sodium hydroxide solution are added dropwise in 12 minutes at 0–5° with vigorous stirring and the reaction temperature is then maintained at 0–5° until coupling is finished. 200 parts of water are added, the pH value of the disazo dyestuff solution adjusted to 5.0–4.5 with acetic acid, 65 parts of a 20% copper sulfate solution are added and the mass heated to 60–70° until formation of the copper complex is completed. It is precipitated with common salt, filtered off, dried and ground, and is then a blue-black powder which dissolves in water to give blue solutions. Applied to polyamide fibers from an acid bath, it gives blue-grey dyeings.

The corresponding cobalt and nickel complexes can be produced on analogous lines. These dye polyamide fibers in neutral grey or reddish grey shades respectively.

With a similar effect the following diazo components can be employed:

2-amino-1-hydroxy-4-(N-dimethylaminosulfonyl-N-methyl)-amino-benzene,
2-amino-1-hydroxy-4-dimethylaminosulfonylamino-6-nitrobenzene,
2-amino-1-hydroxy-4-diethylaminosulfonylamino-5-chlorobenzene,
2-amino-1-hydroxy-4-dipropylaminosulfonylaminobenzene,
2-amino-1-hydroxy-4-methyl-6-(N-diethylaminosulfonyl-N-ethyl)-aminobenzene,
2-amino-1-hydroxy-6-acetylamino-4-dimethylaminosulfonyl-aminobenzene.

Example 6

55.2 parts of 1-amino-2-hydroxy-3-carbethoxyaminobenzene-5-sulfonic acid are suspended in an ice-cold solution of 200 parts of water and 26 parts of 30% hydrochloric acid and diazotized with 13.8 parts of sodium nitrite. 18.6 parts of sodium methylphenylketone-2-carbonate dissolved in 120 parts of water are added to the yellow diazo solution. During the next few hours 250 parts of 10% sodium hydroxide solution are dropped in at an even rate and at 0°, and stirring is continued at the same temperature until completion of the coupling reaction. The reaction solution is then alkalified with 30 parts of 25% aqueous ammonia solution, after which 25 parts of crystallized copper sulfate in 100 parts of water are added. The mass is heated at 60° to permit formation of the complex and subsequently at 90–95° to saponify the carbethoxyamino group. The reaction solution is cooled to 40–50° by adding ice and the blue solution adjusted to pH 6.0 with hydrochloric acid. A solution of 26 parts of 2.4.5.6-tetrachloropyrimidine in acetone is added in 1–2 hours with simultaneous addition of sodium bicarbonate to maintain the pH value at 6.0. On completion of condensation the dyestuff is precipitated with sodium chloride, filtered off, washed with sodium chloride solution and carefully dried with vacuum.

A fast blue-grey shade on cotton is obtained with this dyestuff when the fabric is padded with a 1% dyestuff solution in presence of sodium carbonate, dried heat-treated for a short time at 150° and soaped at the boil.

A dyestuff with equally good properties is obtained when in place of the 26 parts of tetrachloropyrimidine used in the above example 22 parts of trichloropyrimidine are used.

The nickel complex dyestuff produced in accordance with the details gives reddish grey pad dyeings.

Example 7

20 parts of a dyestuff metalized in substance according to the procedure of Example 6 are ground with 26 parts of Lyocol O, an alkylnaphthalene sulfonate condensed with formaldehyde, 3.5 parts of Flotite, the sodium salt of the secondary licorice extract, and 150 parts of water for 140 hours in a ball mill. The finely dispersed suspension is run into 50.000 parts of water at 40°. 1000 parts of nylon fabric are entered in the dyebath, the temperature raised to 100° in 20 minutes and this temperature maintained for 1 hour. The fabric is then rinsed cold.

Even with varry nylon, i.e. nylon of irregular affinity, a very level dyeing fast to light and washing is obtained. With the copper complex compound a brilliant red and with the nickel complex compound a bright green dyeing is obtained.

Example 8

30 parts of a dyestuff produced according to Example 6 and metallized in substance are ground with 40 parts of Lyocol 0.5 part of Flotite and 225 parts of water in ball mill. A nylon fabric is padded with the finely dispersed suspension obtained, steamed wet for 2 minutes at 120°, and soaped for 20 minutes at 80° with a 2% neutral soap solution. The dyeing obtained is very level even when the nylon is of irregular affinity, and it shows high fastness to light and washing. Dyeings produced with the copper and the nickel complex compounds are brilliant red or green respectively.

Formulate of representative dyes of the foregoing examples are as follows:

EXAMPLE 1

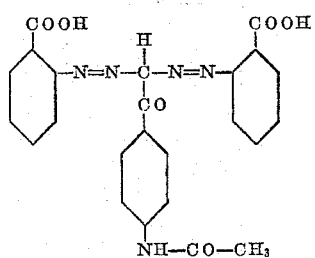

EXAMPLE 2

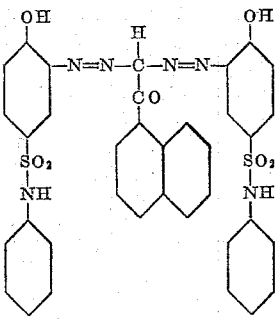

EXAMPLE 3

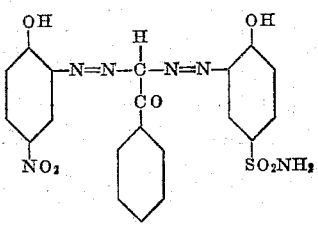

EXAMPLE 4

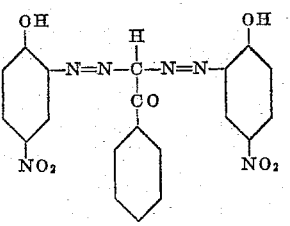

EXAMPLE 5

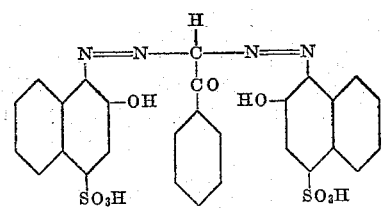

EXAMPLE 6

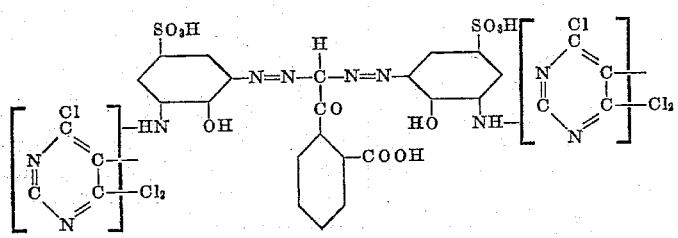

Having thus disclosed the invention what we claim is:

1. A dyestuff selected from the group consisting of dyes of the formula

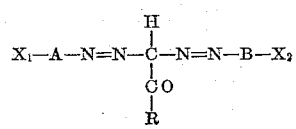

and their 1:1 copper, 1:1 nickel and 1:1 cobalt compounds, wherein each of A and B is a radical selected from the group consisting of naphthalene, naphthalenesulfonic acid and an unsubstituted and a substituted radical of the benzene series, the substituents of the latter radical of the benzene series being selected from the group consisting of nitro, chloro, sulfonic acid amide, sulfonic acid lower alkyl amide, sulfonic acid lower alkoxy-alkylamide, sulfonic acid phenylamide, sulfamidosulfonic acid phenylamide, sulfonic acid lower hydroxy-alkylamide, sulfonic acid cyclohexylamide, sulfonic acid morpholide, sulfonic acid phenylamide carboxylic acid, sulfonic acid phenylamide sulfonic acid, sulfonic acid phenylamide sulfonic acid amide, N-dialkylaminosulfonyl-N-alkylamino, dialkylaminosulfonylamino, acetylamino, di-chlorotriazinylamino, dichloropyrimidylamino, trichloropyrimidylamino; R is a member selected from the group consisting of the tetrahydronaphthalene, a substituted and an unsubstituted benzene and naphthalene radical, the substituents of the substituted benzene radical being chosen from the group consisting of acetylamino, sulfonic acid lower alkoxy alkylamide, sulfonic acid, carboxylic acid, maleylamino, choloroacetylamino, di-(lower alkyl)-aminosulfonylamino, lower alkyl-sulfonylamino, oxazolidonyl, pyrrolidonyl, phenyl, lower alkyl, choro, nitro, dichloro-triazinylamino, dichloropyrimidylamino, trichloropyrimidylamino, and the substituents of the substituted naphthalene radical being chosen from the group consisting of sulfonic acid amide, formylamino, chloroacetylamino, chloro, lower alkyl sulfonyl; and each of $X_1$ and $X_2$ is a member selected from the group consisting of —OH and —COOH, $X_1$ and $X_2$ occupying positions each adjacent to one of the azo bridges in the above formula.

2. An azo dye which corresponds to the formula

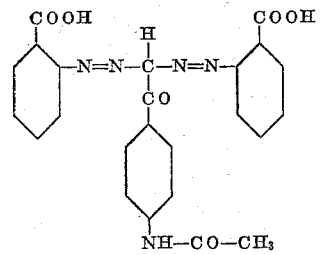

3. An azo dye which corresponds to the formula
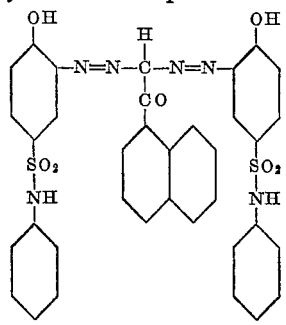
4. An azo dye which corresponds to the formula
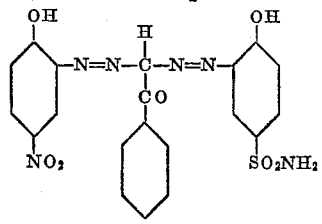
5. An azo dye which corresponds to the formula
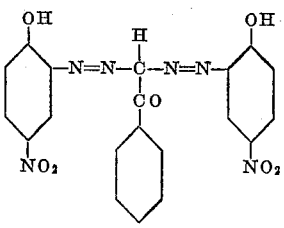
6. An azo dye which corresponds to the formula
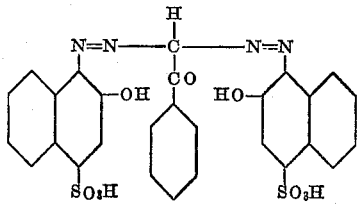
No references cited.

UNITED STATES PATENT OFFICE
CERTIFICATE OF CORRECTION

Patent No. 3,041,328                             June 26, 1962

Wilhelm Kraus, Jr., et al.

It is hereby certified that error appears in the above numbered patent requiring correction and that the said Letters Patent should read as corrected below.

Column 1, line 61, for "below" read -- belong --; column 2, lines 53 and 54, for "hydrochlorid" read -- hydrochloric --; column 3, line 11, for "equeous" read -- aqueous --; line 73, strike out "diazotized"; line 74, for "it is with" read -- it is diazotized with --; column 4, line 31, for "4-pyrralidonyl-acetophenone" read -- 4-pyrrolidonylacetophenone --; column 6, line 51, for "50.000" read -- 50,000 --; line 56, for "varry" read -- barry --; column 7, line 1, for "Formulate" read -- Formulae --; column 8, line 38, for "choro" read -- chloro --.

Signed and sealed this 21st day of May 1963.

(SEAL)
Attest:

ERNEST W. SWIDER                                          DAVID L. LADD

Attesting Officer                                        Commissioner of Patents